United States Patent
Aarestrup et al.

(10) Patent No.: US 8,690,549 B2
(45) Date of Patent: Apr. 8, 2014

(54) CENTRIFUGAL PUMP UNIT

(75) Inventors: Jan Caroe Aarestrup, Bjerringbro (DK); Keld Folsach Rasmussen, Ans (DK)

(73) Assignee: Grundfos Management a/s, Bjerringbro (DK)

( * ) Notice: Subject to any disclaimer, the term of this patent is extended or adjusted under 35 U.S.C. 154(b) by 490 days.

(21) Appl. No.: 12/994,220

(22) PCT Filed: May 8, 2009

(86) PCT No.: PCT/EP2009/003284
§ 371 (c)(1),
(2), (4) Date: Nov. 23, 2010

(87) PCT Pub. No.: WO2009/149796
PCT Pub. Date: Dec. 17, 2009

(65) Prior Publication Data
US 2011/0076157 A1    Mar. 31, 2011

(30) Foreign Application Priority Data
Jun. 9, 2008 (EP) .................. 08010443

(51) Int. Cl.
*F04B 17/00* (2006.01)
(52) U.S. Cl.
USPC ............ 417/409; 318/799; 318/432; 363/15; 363/108; 415/13; 415/89; 415/203; 417/44.1; 417/44.11; 417/45; 417/316; 417/321
(58) Field of Classification Search
USPC ............ 318/400.02, 400.32, 400.33, 400.34, 318/721, 727, 799, 807, 432; 417/7, 45, 417/409, 44.11, 44.1, 316, 321; 363/102, 363/15, 108; 415/13, 89, 203
See application file for complete search history.

(56) References Cited

U.S. PATENT DOCUMENTS

| | | | | |
|---|---|---|---|---|
| 5,240,380 A | * | 8/1993 | Mabe | 417/43 |
| 6,023,137 A | * | 2/2000 | Kumar et al. | 318/400.27 |
| 6,605,912 B1 | * | 8/2003 | Bharadwaj et al. | 318/400.09 |
| 6,965,212 B1 | * | 11/2005 | Wang et al. | 318/700 |
| 7,112,037 B2 | * | 9/2006 | Sabini et al. | 415/118 |
| 7,559,752 B2 | * | 7/2009 | Bahnen et al. | 417/410.1 |

(Continued)

FOREIGN PATENT DOCUMENTS

| EP | 0638457 A2 | 2/1995 |
|---|---|---|
| EP | 1087513 A2 | 3/2001 |

(Continued)

OTHER PUBLICATIONS

Int'l Search Report issued on Jan. 26, 2010 in Int'l Application No. PCT/EP2009/003284.

(Continued)

*Primary Examiner* — Antony M Paul
(74) *Attorney, Agent, or Firm* — Panitch Schwarze Belisario & Nadel LLP

(57) ABSTRACT

The invention relates to a centrifugal pump assembly with an electric drive motor and with a control device having a frequency converter, for the control of the rotational speed of the drive motor, wherein the control device is designed in a manner such that in at least one control region, a field weakening is produced in the drive motor, by way of which the rotational speed of the drive motor is increased.

11 Claims, 5 Drawing Sheets

(56) References Cited

U.S. PATENT DOCUMENTS

| 7,592,766 B2* | 9/2009 | Patel et al. ............... 318/400.02 |
| 8,540,493 B2* | 9/2013 | Koehl ......................... 417/44.11 |
| 2005/0068001 A1 | 3/2005 | Skaug et al. |

FOREIGN PATENT DOCUMENTS

| EP | 1215810 A2 | 6/2002 |
| EP | 1414145 A1 | 4/2004 |
| EP | 1843463 A2 | 10/2007 |
| WO | 2006137777 A1 | 12/2006 |

OTHER PUBLICATIONS

Notice of Opposition dated Mar. 8, 2012, filed against EP Patent No. 2 133 991 B1 by opponent Wilo SE.
Weidauer, "Elektrische Antriebstechnik," Siemens, Publicis Corporate Publishing (2008).
MegaDrive LCI, Nov. 22, 2010.
Vogel et al, "Elektrische Antriebstechnik," Huethig Publishing, Heidelberg (1998).
Vogel et al, "Grundlagen der elektrischen Antriebstechnik mit Berechnungsbeispielen," VEB Publishing, Berlin (1977).
Megadrive LCI Product Brochure (2007).
Busch, "Elektrotechnik und Elektronik," Vieweg + Teubner (2008).
Notice of Opposition dated Mar. 8, 2012, filed against EP Patent No. 2 133 991 B1 by opponent ABB Oy.
Notice of Opposition dated Mar. 8, 2012, filed against EP Patent No. 2 133 991 B1.
Boglietti et al, "Electrical Drives to Increase the Fluid Processing Efficiency," Conference Record of the 2001 IEEE, vol. 2, pp. 1147-1154 (2001).
Kymmene-Stromberg Corp., selected pages from "SAMI Frequency Converters 16 to 1620 kVA—Technical Description & Application Guide" (Sep. 6, 1984).
Morimoto et al, "Expansion of Operating Limits for Permanent Magnet Motor by Current Vector Control Considering Inverter Capacity," IEEE Transactions on Industry Applications, vol. 26, No. 5, pp. 866-871 (Sep./Oct. 1990).
Leonhard, "Control of Electrical Drives," Springer Publishing, Berlin, selected pages (Oct. 1984).
Lindeborg, "Variable Frequency Drives," Scientific Impeller, pp. 33-37 (1998).
Hendershot et al, "Design of brushless permanent-magnet motors," Magna physics Publishing and Clarendon Press, Oxford (1994).
Jahns, "Flux-Weakening Regime Operation of an Interior Permanent-Magnet Synchronous Motor Drive," IEEE Transactions on Industry Applications, vol. IA-23, No. 4 (Jul./Aug. 1987).
Katalog Heizung, "Umwälzpumpen" (Jan. 2007).
Opinion on European Patent Applicaiton No. 08010443.3 by Dr. Volker Staudt, dated Mar. 6, 2012.
Fiedler, Feldschwächbetrieb von WILO Pumpenantrieben am Beispiel Stratos Z 25 1-8 (Mar. 2, 2013).
2007 WILO Price list for Pumps and Pump Systems (Jan. 2007).
Entry in the "German National Library" for Weidauer, "Elektrische Antriebstechnik," Siemens, Publicis Corporate Publishing (2008).
Gutachten zur Europäischen Patentanmeldung 080010443.3 by Dr. Volker Staudt, dated Mar. 6, 2012.

\* cited by examiner

☒ - S₂

☒ - S₁

☒ - S₃

CENTRIFUGAL PUMP UNIT

CROSS-REFERENCE TO RELATED APPLICATIONS

This application is a section 371 of International Application No. PCT/EP2009/003284, filed May 8, 2009, which was published in the German language on Dec. 17, 2009 under International Publication No. WO 2009/149796 A3, the disclosure of which is incorporated herein by reference.

BACKGROUND OF THE INVENTION

The invention relates to a centrifugal pump assembly with an electric drive motor and with a control device having a frequency converter, for controlling the rotational speed of the drive motor.

Centrifugal pump assemblies are known, with which the electrical drive motor is activated by way of a frequency converter, in order to be able to vary the rotational speed of the drive motor and thus of the centrifugal pump assembly. Thereby, it is very desirable to be able to operate the pump assembly with the greatest possible efficiency. The maximum hydraulic power which is available, with known centrifugal pump assemblies, is limited by the maximum frequency as well as the maximum load cycle of the frequency converter. Thereby, the pump assemblies as a rule are designed in a manner such that at least one point of the pump characteristic line with a maximum rotational speed, the maximum load cycle is given by maximum output voltage of the frequency converter, so that the maximum electrical power of the pump is reached there. This however leads to the fact that in other regions of the pump characteristic line with maximum rotational speed, the maximum electrical power of the drive motor which is available is not utilized. This means that there are regions in which the maximum electrical power which is available may not be completely converted into hydraulic power of the pump assembly. In these regions, it is not possible to further increase the pump rotational speed by way of the usual control of the frequency converter, since already the maximum voltage and/or the maximum load cycle of the frequency converter are reached. This means that with a conventional pump control, the maximum electrical power may not be utilized over the whole operating range of the pump.

BRIEF SUMMARY OF THE INVENTION

It is therefore the object of the invention to provide an improved centrifugal pump assembly which permits an extended utilization of the maximum electrical power which is available, in all operating regions of the pump.

The centrifugal pump assembly according to the invention comprises an electrical drive motor, which in the known manner may drive at least one impeller of a centrifugal pump assembly in rotation via a shaft. Furthermore, a control device for the regulation (closed-loop control) or control of the drive motor is provided. This control device according to the invention comprises a frequency converter via which the rotational speed of the drive motor and thus of the pump is variable. Basically, this control device firstly functions as conventional control devices. These conventional control devices have a regulation procedure, according to which the current is held in phase with the induced back E.M.F, i.e. the load angle ρ between the current and the magnetic rotor is held at essentially 90°, since the greatest efficiency of the drive motor is given in this regulation condition.

In order however to be able to further increase the hydraulic power of the pump assembly and thus to be able to completely utilize the electrical maximum power in those regions in which, with a maximum rotational speed of the drive motor which may be achieved with this regulation strategy, for these regions, an alternative regulation strategy is provided in the control device according to the invention. According to the invention, the control device is specifically designed in a manner such that a field weakening in the drive motor is produced in at least one control region. Given the same frequency of the output voltage of the frequency converter, one may further increase the rotational speed of the drive motor by way of this field weakening. This means that in these control regions, it is possible to further increase the motor rotational speed also without increasing the maximum output voltage, i.e. the maximum make-to-break ratio of the frequency converter and the frequency of the output voltage of the frequency converter. Thus by way of the field weakening in the drive motor, it is possible to increase the rotational speed beyond the maximum rotational speed which is given with a conventional regulation strategy. The hydraulic power of the connected centrifugal pump is increased by way of increasing the maximum rotational speed.

The control region with the field weakening is preferably applied in those operating regions of the centrifugal pump in which, with a maximum rotational speed, the maximum available electrical drive power of the drive motor is not yet exhausted. In these regions, the rotational speed may ideally be increased up to the electrical power limit by way of the field weakening, so that it is possible in all operational regions of the centrifugal pump, to utilize the maximum electrical connection power of the drive motor and thus to provide the maximally producible hydraulic power.

With regard to the drive motor, it is preferably the case of a permanent magnet motor, i.e. a motor with a permanent magnet rotor.

The control device is preferably designed in a manner such that the field weakening is produced by way of the load angle ρ of the current with respect to the magnetic field of the rotor being increased beyond 90°, so that the current and the induced back-E.M.F are no longer in phase. This means that in this control region, in which the field weakening is applied, one departs from the regulation strategy used in the other control regions, according to which the current and induced back E.M.F are to be in phase.

Particularly preferably, the control device is designed in a manner such that the control region, in which the field weakening is produced, is situated in the region of a low throughput with a high pressure and/or in the region of a high throughput with a low pressure. These are the regions in which, with a conventional motor regulation, the hydraulic power of the pump is limited by the maximum rotational speed, but at the same time the maximum electrical drive power which is available is not fully utilized. By way of the application of the field weakening in these regions, the rotational speed of the drive motor and thus of the centrifugal pump may be increased beyond the otherwise common maximum, and thus the hydraulic power may be further increased until ideally the maximum electrical connection power of the drive motor is completely utilized.

According to the invention, it is thus possible to provide a centrifugal pump assembly which in individual operating regions, specifically in particular in the regions of a low throughput and high pressure, as well as high throughput at a low pressure, provides a larger hydraulic power, without having to increase the maximum electric connection power of the drive motor or of the centrifugal pump assembly.

Preferably, the control device is thus designed in a manner such that the field weakening is applied such that the maximum electrical output of the pump assembly may also be utilized in the region of a low throughput.

According to a further preferred embodiment, a voltage converter, via which an intermediate voltage supplied to the frequency converter may be changed, is connected in series in front of the frequency converter in the control device of the drive motor. Conventionally, a fixed intermediate voltage or input voltage is led to the frequency converter, and the output voltage of the frequency converter is changed by way of changing the make-to-break ratio, wherein with a maximum make-to-break ratio, i.e. a make-to-break ratio close to 1, in practice about 0.97, the output voltage of the frequency converter corresponds almost to the input voltage. With a reduced make-to-break ratio which is necessary for achieving a reduced output voltage of the frequency converter, the switch losses in the frequency converter increase. This is the case in parts of the pump characteristic field, in which it is not the maximum rotational speed, but a reduced rotational speed of the centrifugal pump assembly which is demanded, since it is not the maximum pressure and/or the maximum throughput, which are demanded.

By way of the preferred arrangement of a voltage converter on the input side of the frequency converter, it is then possible to minimize the mentioned switch losses of the frequency converter, since it is possible to reduce the output voltage of the frequency converter without having to reduce the make-to-break ratio. Rather, the output voltage of the frequency converter is reduced with this control device, in a manner such that the input voltage of the frequency converter is reduced in certain operational regions. For this, the voltage converter may be activated by the control device, in a manner such that it produces a reduced intermediate voltage, which is supplied to the frequency converter as an input voltage. This means the voltage converter permits the frequency converter not to be supplied with a fixed input voltage, for example the mains connection voltage, but the input voltage of the frequency converter may be varied by the voltage converter, in order thus to also change the output voltage of the frequency converter which is supplied to the drive motor, and to simultaneously keep the make-to-break ratio of the frequency converter at the maximum possible value. Thus switch losses in the frequency converter are minimized.

The used voltage converter is preferably an AC-DC converter (alternating voltage-direct voltage converter) or a DC-DC converter (direct voltage-direct voltage converter) with a changeable output voltage. The output voltage may thus be changed in order to supply a desired input voltage to the frequency converter for producing a certain output voltage. As to whether, with regard to the voltage converter, it is a case of an AC-DC converter or a DC-DC converter, depends on which input voltage is supplied to the system, i.e. the control device. This may be the mains voltage, i.e. alternating voltage or however also a direct voltage, if for example a rectifier connected in series in front is yet provided or the press pump assembly is to be operated at direct voltage.

With regard to the voltage converter, it may be the case of a boost converter and/or a buck converter. Depending on the input voltage of the voltage converter and the region of input voltages, with which the frequency converter is to be operated, the voltage converter may be selected such that it increases or reduces the input voltage. Alternatively, one may also provide a voltage converter, which may increase as well as decrease the voltage with respect to the input voltage (buck-boost converter).

Preferably, a capacitor is arranged between the output poles of the voltage converter, via which capacitor a potential drop of the intermediate voltage occurs.

The control device is preferably designed in a manner such that in a first control region, the output voltage of the frequency converter is changed by changing the intermediate voltage, whilst the frequency converter is operated with a maximum make-to-break ratio for its output voltage. This is that control region in which the intermediate voltage may be changed by the voltage converter connected in series in front of the frequency converter, in particular may be reduced with respect to the input voltage of the voltage converter, in order to supply a reduced input voltage to the frequency converter. In this manner, the output voltage of the frequency converter may then also be changed, in particular reduced. Simultaneously, the make-to-break ratio remains unchanged at a maximum, so that the switch losses are kept low. The maximum make-to-break ratio ideally lies at 1, but in practice however this as a rule may not be completely achieved and in practice the maximum make-to-break ratio will lie at about 0.97, in order to retain a control reserve and to be able to control the complete system in a stable manner.

Further preferably, the control device is designed in a manner such that in a second control region, the output voltage of the frequency converter is changed by way of reducing the make-to-break ratio of the frequency converter, whilst the intermediate voltage is preferably set to a fixed minimal voltage or to a minimal voltage with a defined ratio to the mains voltage. This as a rule is the minimal output voltage which may be produced by the voltage converter.

If then, the input voltage of the drive motor is to be further reduced for regulating the drive motor, for example for the further reduction of pressure and throughput of the pump assembly, then for this, the make-to-break ratio of the frequency converter must be reduced. This is in particular a region in which the intermediate voltage which is produced by the voltage converter, may not be reduced further. The minimum of the intermediate voltage may for example also be given due to undesirable disturbances on the connection side being transferred to the mains connection of the centrifugal pump assembly, with a further reduction of the intermediate voltage.

The control device is further preferably designed in a manner such that the first control region, in which the output voltage of the frequency converter is varied by way of changing an intermediate voltage supplied to the frequency converter, is a region of a high power of the pump assembly. The second control region, in which then the make-to-break ratio of the frequency converter is changed at a minimal intermediate voltage, is ideally a control region with a lower power than in the first control region. This means that if the hydraulic power of the pump assembly is to be further reduced, i.e. the pressure and/or throughput are to be reduced further than is possible in the first control region, then the control device uses the second control region.

Further preferably, the control device is designed in a manner such that the control region in which the field weakening, as has been described above, is produced, is a third control region in which the intermediate voltage of the voltage converter is preferably set to its maximum value. This third control region then ideally, as described above, is a region in which the pressure or the throughput may be increased beyond the maximum which may be achieved in the first control region, i.e. beyond the normally achievable maximum rotational speed, in order to utilize the maximum electrical connection power of the drive motor. In this region, the voltage converter is then set by the control device such that the intermediate voltage achieves its maximum value. Simultaneously, the make-to-break ratio of the frequency converter too is set to the maximum in this control region.

The centrifugal pump assembly according to the invention may be preferably designed as a heating circulation pump assembly, a pump assembly for [air] conditioning installations, a pump assembly for solar-thermal applications or as a high-pressure pump assembly. The extended control and regulation region which results by way of the application of the field weakening and/or a reduced intermediate voltage which is supplied to the frequency converter, is advantageous, for all these types of centrifugal pump assemblies.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
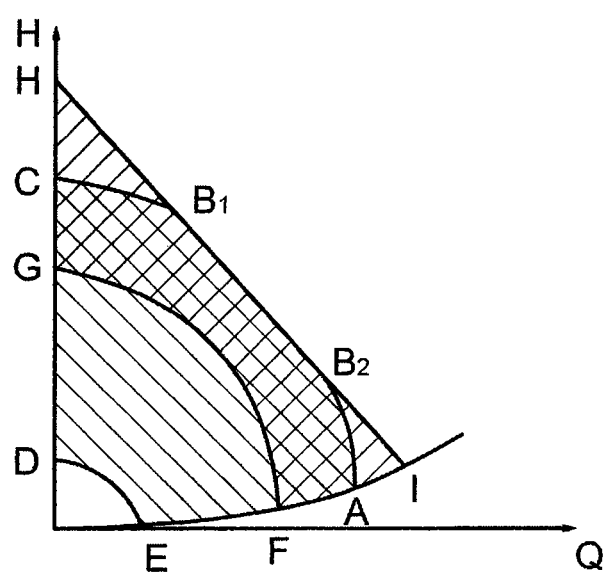
FIG. 1 an HQ-diagram of a centrifugal pump assembly according to the invention.
Figure 2:
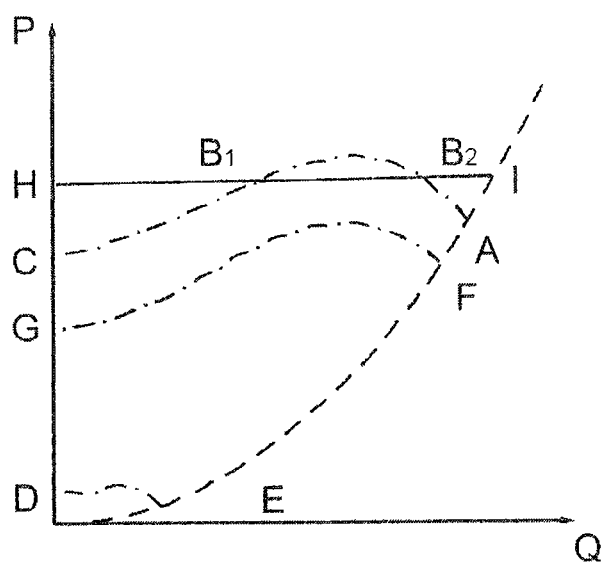
FIG. 2 a PQ-diagram of a centrifugal pump assembly according to the invention.

The basic control and regulation regions of a centrifugal pump assembly according to the invention is explained by way of FIGS. 1 and 2. Thereby, FIG. 1 shows an HQ (pressure-throughput) diagram of a centrifugal pump assembly according to the invention, and FIG. 2 a PQ (power-throughput) diagram. Thereby, P is the electrical input power. The dot-dashed lines in FIG. 2 show the curves of a constant rotational speed $\omega_{konst}$. With a normal control of the drive motor by way of a frequency converter, the operating field of the pump assembly in the HQ-diagram would be limited by the line $CB_1B_2A$. This is the line of maximum rotational speed in the regions $CB_1$ and $B_2A$. The characteristic field between $B_1$ and $B_2$ is limited by the maximum electrical connection power, as may be recognized in FIG. 2. The maximum rotational speed with a conventional control is limited by the maximum exit voltage as well as the maximum make-to-break ratio of the frequency converter. Conventionally, the regulation is effected such that the current is kept in phase with the induced back E.M.F, i.e. the load angle ρ between the current and the magnetic field λ of the rotor is 90°.

From a comparison of FIGS. 1 and 2, one may recognize that in this field, there are regions in which the maximum connection power may not be fully converted into hydraulic power. The regions $HCB_1$ and $AB_2I$ are not fully utilized with a conventional control of the drive motor by way of frequency converter. This means that in these regions, the electrical connection power which is available may not be fully converted into hydraulic power.

Figure 3:
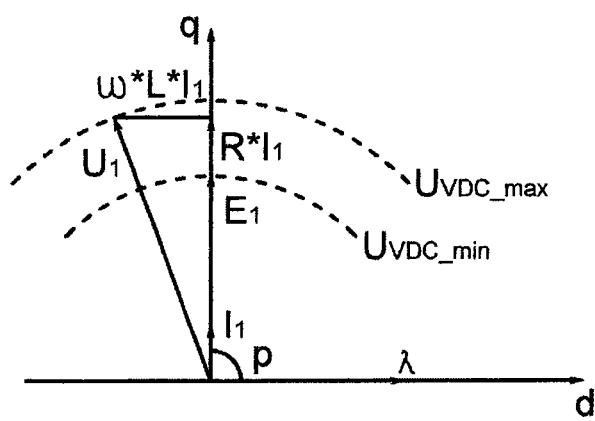
FIG. 3 a vector diagram for the operation of the drive motor in a first control region, FIG. 4 a vector diagram for the operation of the drive motor in a second control region, FIG. 5 a vector diagram for the operation of the drive motor in a third control region, and FIG. 6-8 basis circuit plans for three possible arrangements of a voltage converter in the intermediate circuit.

In these regions however, the rotational speed may not be simply increased by way of conventional control, and the hydraulic power is basically proportional to the product of the Q-axis component of the induced back E.M.F $E_1$ and the phase current $I_1$ (see vector diagram in FIG. 3). In order to be able to increase this hydraulic power and thus the electrical input power, the product of $E_1$ and $I_1$ would have to be increased. In the regions $B_1$ CH and $B_2$IA of the HQ-diagram and PQ-diagram, the rotational speed would have to be increased further. With a motor with a permanent magnet rotor, this corresponds to an increase of the component $E_1$ of the induced back E.M.F $E_1$. With the conventional regulation strategy, with which $E_1$ and phase current $I_1$ are in phase, $E_1$ however may not be increased, since, as is to be seen in FIG. 3, the phase voltage $U_1$ would have to be increased for this. This however already corresponds to the maximum intermediate voltage $U_{VDC\_max}$. $U_{VDC\_max}$ is the maximum intermediate voltage, i.e. the maximum input voltage of the frequency converter. Given a maximum make-to-break ratio of the frequency converter, this voltage may not be further increased.

Figure 5:
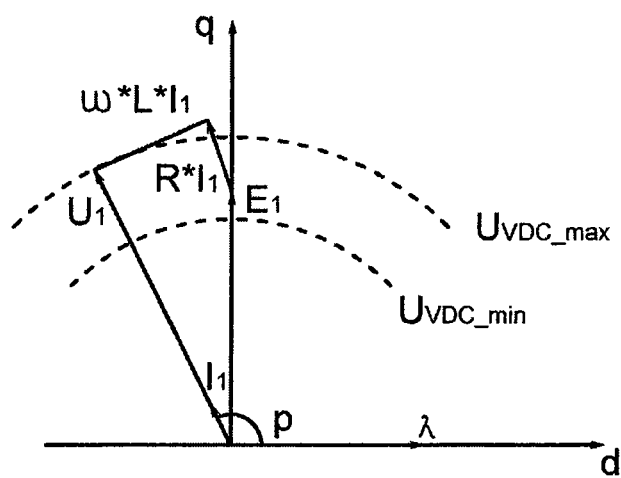

Inasmuch as this is concerned, one may recognize that the mentioned unused regions of the HQ-diagram may not be utilized with the convention control characteristics. According to the invention, these regions are now likewise used as a third control region $S_3$, i.e. it is possible in the regions $E_1$ CH and $B_2$IA to increase the hydraulic power of the pump up to the limit HI set by the maximum electrical connection power. In order to achieve this, the control device of the centrifugal pump assembly according to the invention is designed in a manner such that it affects a field weakening of the drive motor in the third control region $S_3$. This field weakening is produced by way of the control device controlling the phase current $I_1$ in a manner such that it is no longer in phase with the induced back E.M.F $E_1$. This means that the control device increases the load angle ρ between the rotor magnetic field λ and the phase current $I_1$ beyond 90°. In the vector diagram according to FIG. 5, which shows this third control region, it may be recognized that by way of this, the Q-axis component of the induced back E.M.F $E_1$ may be increased compared to the first control region $S_1$, which is shown in the vector diagram according to FIG. 3. The rotational speed of the drive motor is also increased on account of this, without the voltage $U_1$ having to be increased beyond the maximum $U_{VDC\_max}$.

One may thus recognize that the maximum hydraulic power which may be achieved with a given maximum electrical connection power, is available in all operating regions of the centrifugal pump assembly, by way of the field weakening which is applied in the third control region $S_3$. This means that compared to conventional control, in particular in the region of a small throughput Q, the pressure H may be further increased and moreover in the region of a lower pressure H, the throughput Q may be increased beyond the amount which was common until now.

Figure 4:
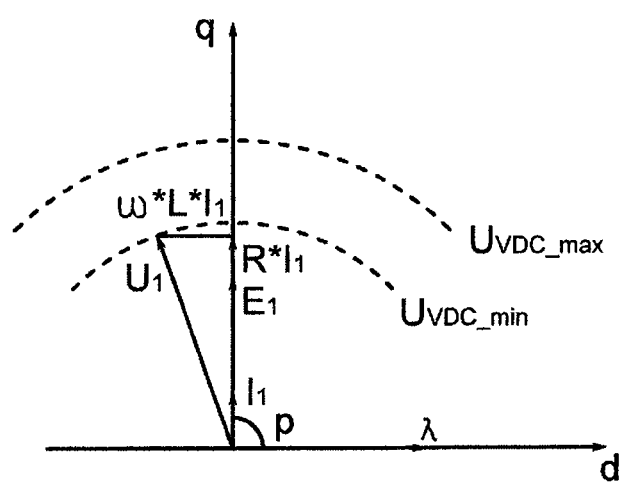

With a particularly preferred embodiment of the invention, in a second control region $S_2$, which connects to the region of a maximum hydraulic power with a reduced hydraulic power, the output voltage of the frequency converter is reduced by way of the intermediate voltage supplied to the frequency converter being reduced via a voltage converter. This second control region is the region which is limited by the points A, $B_2$, $B_1$, C, G and F in the diagrams according to FIGS. 1 and 2. In this region, the previously described field weakening is switched off, i.e. the load angle ρ between the magnetic flux λ and current $I_1$ is 90°. In this second control region, the intermediate voltage $U_{VDC}$ is varied between $U_{VDC\_min}$ and $U_{VDC\_max}$ (see vector diagrams according to FIG. 3 to 5) by way of a voltage converter connected in series in front of the frequency converter.

Figure 6:
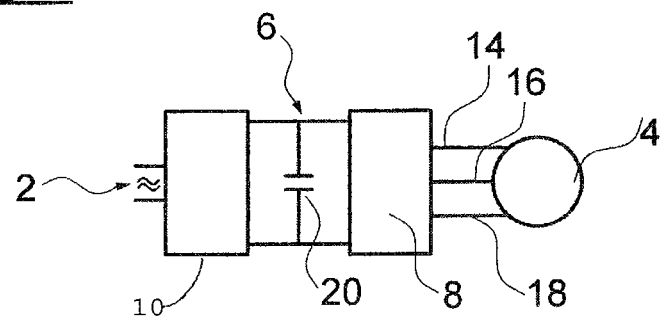
Figure 7:
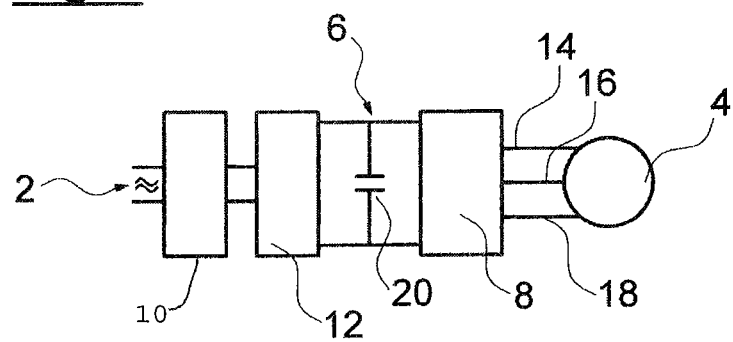
Figure 8:
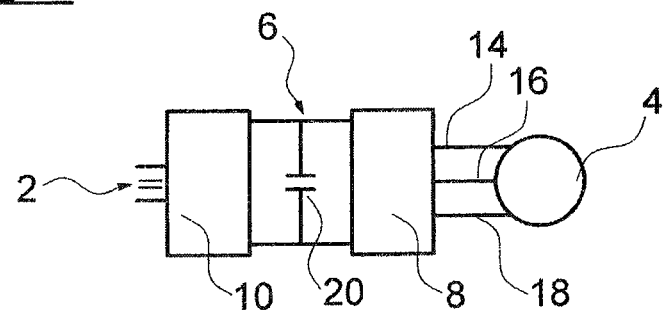

Possible arrangements of such a voltage converter are shown in the FIGS. 6 to 8. Common to the three embodiment examples according to FIG. 6 to 8 is the fact that a control device 6 is arranged between the mains connection 2 and a drive motor 4 of the centrifugal pump assembly. The control device 6 as an essential component comprises a frequency converter 8 which varies the frequency of the voltage supplied to the drive motor 4 in order to vary the rotational speed of the drive motor 4. The drive motor 4 is designed as a permanent-magnetic synchronous motor and in the present case as a three-phase motor.

The control device 6 between the mains connection 2 and the frequency converter 8 moreover comprises an intermediate circuit, in which a voltage converter 10 is arranged. With the embodiments according to FIGS. 6 and 7, the voltage converter 10 is an AC-DC converter. This means that the mains connection 2 is connected to an alternating voltage, usually 230 volt alternating voltage. The voltage converter 10 converts this voltage into a constant voltage. According to FIG. 6, the voltage converter 10 is designed as a buck-converter which may output a changing exit voltage, so that the intermediate voltage on the output side of the voltage converter 10 may be varied between $U_{VDC\_min}$ and $U_{VDC\_max}$ by the control device 6. In this manner, the output voltage of the frequency converter 8 may be reduced without changing the make-to-break ratio of the frequency converter.

With the embodiment example according to FIG. 7, a second voltage converter 12 is connected in series after the voltage converter 10. With this embodiment, the voltage converter 10 produces a constant direct voltage as an output voltage, which may then be varied by a voltage converter 12, preferably a buck-converter, which is connected afterwards in series, in order to supply a changing input voltage to the frequency converter 8 as described.

The third embodiment example according to FIG. 8 again has only one voltage converter 10, which in this case is however designed as a D.C. converter. Here, the mains connection 2 is connected to a D.C. voltage. The voltage converter 10 which here is preferably designed as a buck-converter, then changes this voltage such that a changing input voltage may be supplied to the frequency converter 8.

The frequency converter sets the voltage then in the desired frequency and leads this to the three phases 14, 16, 18 of the drive motor 4, wherein the three phases 14, 16, 18 are activated in a phase-shifted manner in the known manner, in order to produce the desired rotation of the drive motor.

With the embodiments according to FIGS. 6 and 8, the voltage converter 10 may be a buck-converter or boost-converter or however also a combined buck-boost converter. The same applies to the voltage converter 12 in the embodiment example according to FIG. 7. Preferably, the voltage converter 10 in the embodiment examples according to FIGS. 6 and 8 and the voltage converter 12 in the embodiment example according to FIG. 7 are controlled by the control device such that they produce an intermediate voltage and output voltage which are in a fixed, settable relation to the mains voltage or input voltage.

With all three embodiment examples, one may reduce the intermediate voltage $U_{VDC}$ which is supplied to the frequency converter 8 as an input voltage only to a predefined minimum $U_{VDC\_min}$. For this reason, in the operating region of the centrifugal pump assembly which is limited in FIGS. 1 and 2 by the points G, F, E, D and forms a second control region $S_2$, the frequency converter 8 is controlled by the control device 6 in a manner such that given a minimal input voltage $U_{VDC\_min}$, the voltage is reduced further by way of changing the make-to-break ratio of the frequency converter.

According to the invention, thus there results three control regions $S_1$, $S_2$ and $S_3$ which cover the complete operating region of the centrifugal pump assembly, as is shown in the diagrams according to FIGS. 1 and 2. In the first control region $S_1$, the frequency converter 8 is operated with a constant maximum make-to-break ratio, and the supplied intermediate voltage $U_{VDC}$ is changed via a voltage converter. In a second control region $S_2$, with a constant minimal intermediate voltage $U_{VDC}$, the make-to-break ratio of the frequency converter is now changed, i.e. is reduced with respect to the first control region $S_1$. In a third control region $S_3$, again the make-to-break ratio of the frequency converter 8 is maximal and simultaneously the intermediate voltage $U_{VDC}$ is maximal. The field weakening of the drive motor which is described above is applied in this region, so that in this control region $S_3$, the rotational speed ω of the drive motor and of the centrifugal pump assembly may be increased beyond the maximum which is usual with a conventional control.

The invention claimed is:

1. A centrifugal pump assembly with an electric drive motor, and a control device having a frequency converter, for the control of the rotational speed of the drive motor, characterized in that the control device is designed in a manner such that in at least one control region, which is situated in a region of a low throughput at a high pressure and/or in a region of a high throughput at a low pressure, a field weakening is produced in the drive motor by way of which the rotational speed of the drive motor is increased and the field weakening is applied such that the maximum electrical power of the centrifugal pump assembly may be utilised also in the region of a low throughput.

2. A centrifugal pump assembly according to claim 1, characterized in that the drive motor has a permanent magnet rotor.

3. A centrifugal pump assembly according to claim 1, characterized in that it is the case of a heating circulation pump assembly, a pump assembly for air conditioning installations, a pump assembly for solar-thermal applications or a high-pressure pump assembly.

4. A centrifugal pump assembly with an electric drive motor, and with a control device having a frequency converter, for the control of a rotational speed of the drive motor, characterized in that the control device is designed in a manner such that in at least one control region a field weakening is produced in the drive motor by way of which the rotational speed of the drive motor is increased and such that the field weakening is produced by way of the load angle of the current with respect to the magnetic field of the rotor being increased beyond 90°, so that the current and the induced back E.M.F are no longer in phase.

5. A centrifugal pump assembly with an electric drive motor, and with a control device having a frequency converter, for the control of a rotational speed of the drive, characterized in that the control device is designed in a manner such that in at least one control region a field weakening is produced in the drive motor by way of which the rotational speed of the drive motor is increased and that in a first control region, an output voltage of the frequency converter is changed by way of changing an intermediate voltage, whilst the frequency converter is operated with a maximum make-to-break ratio for its output voltage, and a voltage converter is connected in series in front of the frequency converter, by which converter, the intermediate voltage supplied to the frequency converter may be changed.

6. A centrifugal pump assembly according to claim 5, characterized in that the voltage converter is an AC-DC converter or a DC-DC converter with a changeable output voltage.

7. A centrifugal pump assembly according to claim 5, characterized in that the voltage converter is a boost-converter and/or a buck-converter.

8. A centrifugal pump assembly according to claim 5, characterized in that at least one capacitor is arranged between the output poles of the voltage converter.

9. A centrifugal pump assembly according to claim 5, characterized in that the control device is designed in a manner such that the first control region is a region of a high power of the pump assembly.

10. A centrifugal pump assembly according to claim 5, characterized in that the control device is designed in a manner such that the control region in which the field weakening is produced, is a third control region in which the intermediate voltage is set by the voltage converter, preferably to its maximum value.

11. A centrifugal pump assembly according to claim 5, characterized in that the control device is designed in a manner such that in a second control region, the output voltage of the frequency converter is changed by way of reducing the make-to-break ratio of the frequency converter, whilst the intermediate voltage is preferably set to a fixed minimal voltage or a minimal voltage with a predefined ratio to the mains voltage.

* * * * *